United States Patent Office 3,595,857
Patented July 27, 1971

3,595,857
ALUMINUM HALIDE COMPLEXES WITH RIFAMYCINS AND THEIR DERIVATIVES
Joseph Anthony Mollica, Jr., Madison, Carl Richard Rehm, Bridgewater Township, Somerville, and Lincoln Harvey Werner, Summit, N.J., assignors to Ciba Corporation
No Drawing. Filed Nov. 7, 1968, Ser. No. 774,191
Int. Cl. C07d 87/54
U.S. Cl. 260—239.3                    4 Claims

ABSTRACT OF THE DISCLOSURE

Complex salts derived from the rifamycins or their semisynthetic derivatives and aluminum salts exhibit enhanced water solubility.

BACKGROUND OF THE INVENTION

According to P. Sensi et al., Il Farmaco, Ed. Sch. 16, 165 (1961), it is known that the "monobasic acid, rifamycin SV forms neutral salts with organic and inorganic bases." Accordingly, the sodium salt was prepared either from rifamycin SV and sodium hydroxide (in the presence of sodium ascorbate and disodium phosphate), or from rifamycin S and sodium ascorbate (in phosphate buffer at pH 7.3). The resulting sodium salt was then reacted with an excess of rubidium, magnesium or calcium chloride, or rifamycin SV with potassium methoxide or organic bases, in order to obtain the potassium, rubidinum, magnesium, calcium or organic salts of rifamycin SV. "These salts were scarcely soluble in water" (ibid.). Basically substituted rifamycin derivatives also form acid addition salts, as it follows, for example, from German Pat. No. 1,237,119.

SUMMARY OF THE INVENTION

The present invention concerns and has for its object the provision of new complex salts derived from rifamycines or their semisynthetic derivatives and aluminum salts, preferably of those having the Formula I

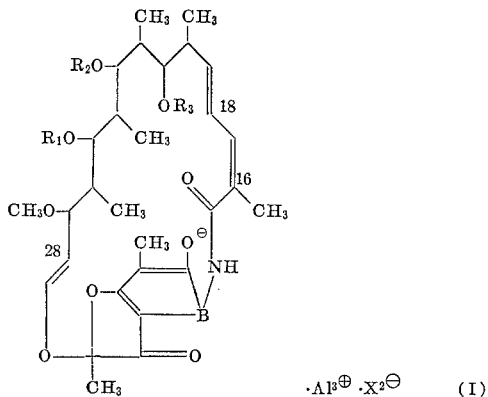

or their in 16-, 18- and/or 28-position hydrogenated forms, in which each of $R_1$, $R_2$ and $R_3$ is hydrogen or 2 thereof are hydrogen and one thereof, preferably $R_1$, is acetyl, X is the anion of an inorganic or organic acid forming with aluminum a water-soluble, non-toxic salt and B represents one of the moieties

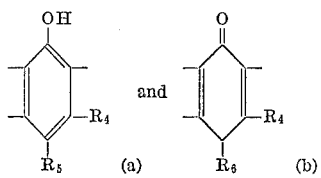

wherein $R_4$ is hydrogen, etherified mercapto, primary, secondary, or tertiary amino, acylated hydrazino, aminomethyl, iminomethyl, hydrazinomethyl, hydrazonomethyl, hydroxymethyl, oxomethyl or dialkoxymethyl, $R_5$ is free or etherified hydroxy and $R_6$ is oxo, oxoethylenedioxy or diazo, whereby $R_4$ and $R_{5,6}$ can be linked together, thereby forming a mono- or polycyclic, preferably an aza-, diazo- or oxaazacyclic, ring system (for example, $R_4$ representing oxy or amino and $R_6$ imino, may be linked together by an orthophenylene radical to form a 6-membered ring, or $R_5$ representing (alkyl, hydroxyalkyl, aralkyl or aryl)-amino and $R_4$ alkyl or (alkoxy, amino, alkylamino, dialkylamino or arylamino)-methyl, may be linked together by alkylidyne to form a 5-membered ring) of corresponding pharmaceutical or veterinary compositions, feed-stuffs or feed additives, as well as of methods for the preparation and application of these products. Said compositions are useful antibiotics, preferably for application in liquid form.

DESCRIPTION OF THE PREFERRED EMBODIMENTS

The rifamycine component in the new compounds of Formula I is known and represents especially the rifamycines B, SV, S, O, AG or X, rifamide, rifazine or advantageously rifampicin. Said component is described, inter alia, in Il Farmaco, Ed. Sci. 16, 755 and 766 (1961), 21, 68 (1966) and 22, 307 (1967); J. Med. Chem. 7, 596 (1964), 8, 790 (1965) and 11, 936 (1968); Antimicrobial Agents and Chemotherapy (Am. Soc. Microbiol.) 1965, p. 765 or 1967, p. 699, the Report of the 5th Internatl. Congr. of Chemotherapy, 1967; French Pats. Nos. 1,434,532, 1,457,435 and 5518M, Belgian Pat. Nos. 654,209 and 685,886, South African Pat. 68/0903 and U.S. Pat. No. 3,349,082.

The anion X is preferably derived from inorganic acids, advantageously mineral acids, but also from organic acids, advantageously carboxylic or sulfonic acids, that form with aluminum water-soluble non-toxic salts. Such acids are above all hydrohalic, e.g. hydrochloric, hydrobromic or hydriodic acid, but also nitric, sulfuric or perchloric acid; formic, acetic, propionic, succinic, glycollic, lactic, malic, tartaric, gluconic, citric, ascorbic, maleic, hydroxymaleic, pyruvic, phenylacetic, benzoic, anthranilic, 4-aminobenzoic, salicylic, 4-hydroxybenzoic, 4-aminosalicylic, embonic, cinnamic, nicotinic, methanesulfonic, ethanesulfonic, 2-hydroxyethanesulfonic, ethylenesulfonic, benzenesulfonic, p-toluenesulfonic, napthalenesulfonic or sulfanilic acid, methionine, tryptophan, lysine or arginine.

The complex salts of this invention exhibit valuable pharmacological properties. Thus, they are very potent antibacterial agents, for example, against gram positive bacteria, such as the staphylococci or mycobacterium tuberculosis, as can be shown in in vitro or in vivo tests using, for example, mammals, such as mice, rats, dogs or monkeys, as test objects. Moreover, they exhibit an enhanced stability and solubility in water or aqueous pharmaceutical excipients. They can be used in the same dosages known for the refamycine component used as starting material. Besides their above-mentioned utility, the compounds of the invention are also useful intermediates in the preparation of other valuable products, primarily of pharmacologically active compounds.

Particularly useful are the complexes of Formulae Ia and b, in which X stands for the anion of a mineral acid, preferably such of a hydrohalic acid, $R_1$ is acetyl, each of $R_2$ and $R_3$ is hydrogen, $R_4$ is hydrogen, amino-lower alkylmercapto, di-lower alkylamino-lower alkylmercapto, lower alkylamino, lower cycloalkylamino, phenylamino, aminophenylamino, naphthylamino, pyridylamino, pyrimidinylamino, imidazolinylamino, lower alkyleneimino, lower monoaza- or oxa- alkyleneimino or N-lower alkyl- or N-hydroxylower alkyl-lower monoaza-alkyleneimino, di-lower alkylaminomethyl, lower alkyleneiminomethyl, lower alkyl- or alkoxyiminomethyl, hydrazonomethyl, di-lower alkyl-hydrazonomethyl, lower alkylenehydrazonomethyl, lower monoaza- or oxa-alkylenehydrazonomethyl or N-lower alkyl-lower monoaza-alkylene-hydrazonomethyl, $R_5$ is hydroxy, carboxymethoxy, N,N-di-lower alkyl-carbamoylmethoxy or N,N,N-tri-lower alkyl-hydrazino-carbonylmethoxy and $R_6$ is oxo or oxoethylene-dioxy or $R_4$ and $R_6$ represent amino and imino respectively, linked together by ortho-phenylene, i.e. $R_4$ and $R_6$ together stand for

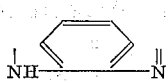

Especially valuable are the complex salts formed from the rifamycines B, SV, S, O or AG, rifamide, rifazine or preferably rifampicin with aluminum halides, preferably the chloride.

Outstanding solubility and stability in water at a physiological tolerable pH-range (e.g. between about 3.5 and 5) shows the complex salt of rifampicin and aluminum chloride, which is unique as compared wtih the less soluble complex salts formed with magnesium, calcium, zinc or ferric chloride.

The compounds of the invention, e.g. those of Formula I, preferably contain one mol equivalent of aluminum and two mol equivalents of the anion X per mol rifamycin component. This proportion, however, may vary, depending on the amounts of the aluminum salt used in the reaction with the rifamycin component and the acidity or basicity of the latter.

The compounds of the invention are prepared according to methods in themselves known. Advantageously they are obtained by reacting a rifamycin or a semisynthetic derivative thereof with the corresponding aluminum salt in a suitable, preferably neutral or slightly acidic, medium and, if desired, mixing the resulting solution with another medium until the complex formed precipitates.

Said medium is either an aqueous or anhydrous medium, such as a lower alkanol, e.g. methanol, ethanol or isopropanol. It may contain, for example, antioxidants, e.g. ascorbic acid or its salts. Said medium may then be changed, for example, by the addition of another medium in which the complex salts formed are insoluble, e.g. the alcoholic medium may be diluted with an ether, preferably a lower aliphatic ether, such as diethyl ether, in order to precipitate the desired complex salt.

The above process is otherwise carried out according to standard methods, in the presence or absence of other diluents, catalysts, and/or inert atmospheres, at low temperatures, room temperature or elevated temperatures, at atmospheric or superatmospheric pressure.

The invention further includes any variant of the present process in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the above reactions that lead to the formation of those compounds indicated above as being the preferred embodiments of the invention.

The obtained complex salts, which may be present in the anhydrous form, in the form of various hydrates or as a solution, e.g. in the medium used in the above reaction, can be used, for example, in the purification of the rifamycines or their derivatives, but preferably in the manufacture of pharmaceutical or veterinary compositions, containing them in conjunction or admixture with inorganic or organic, solid or liquid pharmaceutical excipients suitable for enteral or especially for parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or preferably in liquid form as isotonic solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. The compositions are prepared by conventional methods; they usually contain about 0.1 to 75%, particularly about 1 to 50% of the active complex salt.

The complex salts of the invention can also be used in the form of animal feedstuffs or additives for feedstuffs or preferably the drinking water, in order to promote the growth and feed efficiency of domestic animals. They contain the active complex salts together with conventional extenders, diluents and/or nutrients, such as sucrose, glucose, molasses, fermentation residues, cornmeal, ground and rolled oats, wheat shorts and middlings, meat scrap, oil cake, soybean and fish meal, alfalfa, clover or grass clippings and the like, mineral supplements, such as bone meal, calcium carbonate, iodized salt and the like, vitamins, such as vitamins A, B, C and D, and other suitable substances, such as preservants, e.g. benzoic acid. The feedstuffs contain the active complex salts in the antibiotically active dosage range, for example, between about 0.00001 and 0.01%, whereas the additives may contain the pure substances, when used, for example, for the drinking water, but usually contain between about 1 and 75% thereof.

The following examples illustrate the invention and are not to be construed as being limitations thereon. Temperatures are given in degrees centigrade and all parts wherever given are parts by weight.

Example 1

To the solution of 2.47 g. rifampicin in 30 ml. anhydrous methanol, the solution of 0.40 g. aluminum chloride in 15 ml. methanol is added while stirring, whereby a color change is observed immediately. The mixture is stirred for 2 minutes and poured into about 1 liter diethyl ether. The suspension formed is allowed to stand for 10 minutes. The precipitate is filtered off, washed with diethyl ether and dried in vacuo, to yield the red rifampicin-aluminum chloride complex salt (1:1) which melts and decomposes at above 200° C.

Example 2

To the stirred solution of 2.47 g. rifampicin in 30 ml. anhydrous methanol, the solution of 0.4 g. anhydrous aluminum chloride in 15 ml. methanol is slowly added, and stirring is continued for about 2 minutes. The mixture is then poured into 800 ml. anhydrous diethyl ether, the precipitate formed allowed to age for about 10 minutes, filtered off, washed with diethyl ether and dried.

1.65 g. of the precipitate is triturated with 50 ml. of ethanol-chloroform and the suspension filtered. The filtrate is added to 800 ml. diethyl ether while stirring and the precipitate formed filtered off and washed with diethyl ether, to yield the rifampicin-aluminum chloride complex salt (1:1).

Example 3

To the suspension of 5.0 g. rifampicin in 40 ml. isopropanol, the solution of 0.8 g. anhydrous aluminum chloride in 10 ml. methanol and 4 ml. of an about 3 N solution of hydrogen chloride in ethyl acetate, is added while stirring and stirring is continued until a clear solution is obtained. It is poured into 300 ml. diethyl ether and, after standing for 20 minutes at room temperature, the precipitate formed is filtered off and washed with diethyl ether, to yield the rifampicin aluminum chloride complex salt (1:1) which, for the most purposes, is sufficiently pure.

Example 4

5.0 g. of the rifampicin aluminum chloride complex salt, obtained according to Example 3, is dissolved in 35 ml. ethanol while stirring, and the solution obtained poured into 200 ml. diethyl ether. After standing for 20 minutes in the refrigerator, the precipitate formed is filtered off, washed with diethyl ether and dried for 16 hours at 45° and 1 mm. Hg, to yield the rifampicin aluminum chloride pentahydrate complex salt analyzing in accordance with the empirical formula $$C_{43}H_{58}N_4O_{12} \cdot AlCl_2 \cdot 5H_2O$$

It begins to shrink and decompose above 195° (but does not melt up to 280°).

The water content of the above hydrate (8.88%) may vary between about 7.2 and 13.2%, depending on the drying conditions.

Example 5

To the suspension of 2.5 g. rifampicin in 15 ml. water containing 50 mg. ascorbic acid, 3 ml. N aqueous sodium hydroxide are added while cooling and stirring. The solution obtained is combined with that of 0.75 g. aluminum chloride hexahydrate in 10 ml. water, whereupon a voluminous precipitate is formed, which redissolves slowly to yield a clear red solution having a pH of about 4. Upon addition of N aqueous sodium hydroxide, the pH can be raised slowly to about 4.8, whereby a strong buffering effect is noted. Further addition of sodium hydroxide results in the formation of a precipitate.

The above solution of pH~4 can be used as such without further purification.

Example 6

Additive for chicken drinking water:

|  | G. |
|---|---|
| Rifampicin-aluminum chloride (1:1) complex | 30.00 |
| Sodium ascorbate | 10.00 |
| Confectioners sugar | 110.00 |

An aqueous solution containing 0.001% of the active ingredient may be prepared from said additive.

Example 7

The solution of 100 g. rifampicin-aluminum chloride (1:1) complex and 25 g. sodium ascorbate in 1.5 liter water is sterilized by filtration and lyophilized at −30° under nitrogen. The dry product is distributed over 1000 appropriate vials which are sealed under sterile condition. The content of one vial (containing 100 mg. of the active ingredient) is dissolved in 3 ml. isotonic saline, in order to obtain an intramuscular injectable solution.

We claim:

1. A complex salt derived from 1 mole of the rifamycines B, SV, S, O or AG, rifamide, rifampicin or rifazine and 1 mole of an aluminum halide.

2. A complex salt as claimed in claim 1 and derived from 1 mole of rifampicin and 1 mole of an aluminum halide.

3. A complex salt as claimed in claim 2 and being the rifampicin-aluminum chloride (1:1) complex salt.

4. A complex salt as claimed in claim 3 and having the empirical formula $C_{43}H_{58}N_4O_{12} \cdot AlCl_2$ or a hydrate thereof.

References Cited

UNITED STATES PATENTS 3,349,082 10/1967 Maggi et al. _____ 260—239.3

HENRY R. JILES, Primary Examiner

R. T. BOND, Assistant Examiner

U.S. Cl. X.R.

424—285